(12) United States Patent
Uchino et al.

(10) Patent No.: US 8,798,859 B2
(45) Date of Patent: Aug. 5, 2014

(54) SUSPENSION CONTROL APPARATUS

(75) Inventors: Toru Uchino, Yokohama (JP); Ryusuke Hirao, Kamagaya (JP); Yohei Katayama, Yokohama (JP); Hiroyuki Yabe, Akashi (JP); Hiroki Ohara, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/996,120

(22) PCT Filed: Jan. 31, 2012

(86) PCT No.: PCT/JP2012/052141
§ 371 (c)(1),
(2), (4) Date: Jun. 20, 2013

(87) PCT Pub. No.: WO2012/105556
PCT Pub. Date: Aug. 9, 2012

(65) Prior Publication Data
US 2013/0275003 A1    Oct. 17, 2013

(30) Foreign Application Priority Data
Jan. 31, 2011  (JP) .................................. 2011-018637

(51) Int. Cl.
*G06F 19/00*    (2011.01)
(52) U.S. Cl.
USPC .......................................................... 701/40
(58) Field of Classification Search
None
See application file for complete search history.

(56) References Cited

U.S. PATENT DOCUMENTS

| | | | | |
|---|---|---|---|---|
| 5,467,280 A | * | 11/1995 | Kimura | 701/37 |
| 6,219,601 B1 | | 4/2001 | Shono et al. | |
| 2008/0004770 A1 | * | 1/2008 | Masamura | 701/37 |
| 2012/0247888 A1 | * | 10/2012 | Chikuma et al. | 188/266.1 |

FOREIGN PATENT DOCUMENTS

| | | |
|---|---|---|
| JP | 3-239830 | 10/1991 |
| JP | 11-198627 | 7/1999 |
| JP | 2009-281584 | 12/2009 |

OTHER PUBLICATIONS

International Search Report issued Apr. 17, 2012 in International Application No. PCT/JP2012/052141.

* cited by examiner

*Primary Examiner* — Thomas Tarcza
*Assistant Examiner* — Adam Alharbi
(74) *Attorney, Agent, or Firm* — Wenderoth, Lind & Ponack, LLP

(57)    ABSTRACT

[Object]
The present invention provides a suspension control apparatus that allows miniaturization of a solenoid valve.
[Solution]
When a controller is started up by a power source controller (a power source unit), the controller switches a control current from 0 ampere to a maximum current value I6 at the same time as the startup. After that, the control shifts to normal control. As a result, even if a hysteresis of a damping force characteristic is large relative to the control current, it is possible to promptly move a solenoid valve to a position to be used in the normal control.

12 Claims, 13 Drawing Sheets

SUSPENSION CONTROL APPARATUS

TECHNICAL FIELD

The present invention relates to a suspension control apparatus.

BACKGROUND ART

There are known suspension apparatuses for vehicles, which include a damping force adjustable shock absorber equipped with a fail-safe mechanism (for example, refer to Patent Literature 1). According to such suspension apparatuses, starting an engine wile an ignition is in an ON state triggers a raise of a flag that permits a controller to control a damping force characteristic (hereinafter referred to as a control permission flag). Accordingly, the controller controls a control electric current for driving a solenoid valve of a damping force generation mechanism, so as to switch it from 0 ampere to, for example, a current value (0.3 ampere) positioned at a lowest current in normal control, which generates a damping force of a soft characteristic (S/S).

CITATION LIST

Patent Literature

[PTL 1] Japanese Patent Application Public Disclosure No. 2009-281584

SUMMARY OF INVENTION

Technical Problem

However, according to the suspension control of the above-described conventional technique, miniaturization of the solenoid leads to an insufficient movement of the valve even with supply of the control current (0.3 ampere) instructing the soft characteristic (S/S) due to a hysteresis of the damping force characteristic, since this hysteresis is large relative to the control current in this case. As a result, even if the soft characteristic (S/S) is instructed, the damping force does not shift to the soft characteristic (S/S), generating an unnecessary damping force. Consequently, the ride quality of the vehicle may be deteriorated due to an upward thrust and tension on a bad road surface or the like.

The present invention has been contrived in consideration of these circumstances, and an object of the present invention is to provide a suspension control apparatus that allows miniaturization of a solenoid valve.

Solution to Problem

To achieve the above-described object, a suspension control apparatus according to the present invention includes a damping force adjustable shock absorber disposed between a body and each wheel of a vehicle and capable of adjusting a damping force characteristic by adjusting a control current to be supplied to a solenoid, a running state detector configured to detect a running state of the vehicle, and a controller configured to calculate a damping force that the controller causes the damping force adjustable shock absorber to generate based on a detection result of the running state detector, and determine a current value of the control current based on a result of the calculation, thereby performing normal control. The damping force adjustable shock absorber is configured to generate a hard characteristic by a current value larger than a current value of the control current corresponding to a soft characteristic. The controller performs initialization control, according to which the controller switches the control current to a current value larger than the current value for instructing the damping force of the soft characteristic, and after that, performs the normal control.

Advantageous Effects of Invention

According to the present invention, it is possible to provide a suspension control apparatus that allows miniaturization of a solenoid valve.

DESCRIPTION OF EMBODIMENTS

An embodiment of the present invention will be described with reference to the accompanying drawings.

Figure 1:
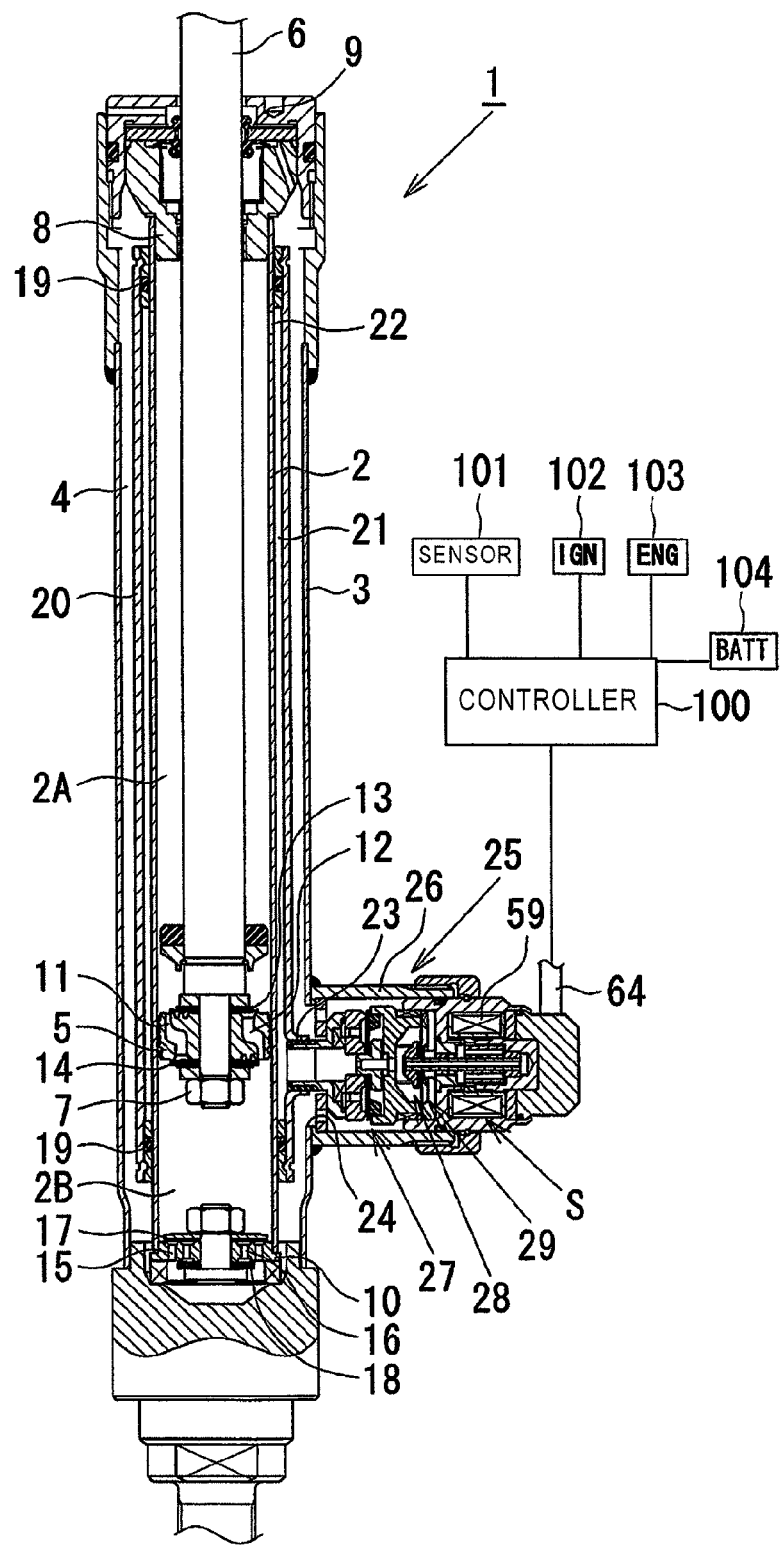
FIG. 1 is a cross-sectional view of a damping force adjustable shock absorber used in a suspension control apparatus according to an embodiment of the present invention, illustrating the damping force adjustable shock absorber taken along an axial plane.

A suspension control apparatus according to the present embodiment includes a damping force adjustable shock absorber 1 illustrated in FIG. 1. The damping force adjustable shock absorber 1 is configured as a double-cylinder structure having a cylinder 2 and an outer tube 3 disposed around the cylinder 2. A reservoir 4 is defined between the cylinder 2 and the outer tube 3. A piston 5 is slidably fittedly inserted in the cylinder 2. The interior of the cylinder 2 is defined into two chambers, namely, a cylinder upper chamber 2A and a cylinder lower chamber 2B by this piston 5. One end of a piston rod 6 is coupled to the piston 5 by a nut 7. The other end of the piston rod 6 extends through the cylinder upper chamber 2A, is inserted through a rod guide 8 and an oil seal 9 attached to upper ends of the cylinder 2 and the outer tube 3, and extends to the outside of the cylinder 2. A base valve 10 is mounted at a lower end of the cylinder 2. The base valve 10 divides the cylinder lower chamber 2B from the reservoir 4.

Passages 11 and 12 are formed at the piston 5. The passages 11 and 12 establish communication between the cylinder upper and lower chambers 2A and 2B. A check valve 13 is provided in the passage 12. The check valve 13 allows only a flow of fluid from the cylinder lower chamber 2B to the cylinder upper chamber 2A. A disk valve 14 is provided in the passage 11. The disk valve 14 is opened when a pressure of fluid in the cylinder upper chamber 2A reaches a predetermined pressure, thereby releasing this pressure to the cylinder lower chamber 2B. Passages 15 and 16 are formed at the vase valve 10. The passages 15 and 16 establish communication between the cylinder lower chamber 2B and the reservoir 4. A check valve 17 is provided in the passage 15. The check valve 17 allows only a flow of fluid from the reservoir 4 to the cylinder lower chamber 2B. A disk valve 18 is provided in the passage 16. The disk valve 18 is opened when a pressure of fluid in the cylinder lower chamber 2B reaches a predetermined pressure, thereby releasing this pressure to the reservoir 4. Oil as hydraulic fluid is sealingly contained in the cylinder 2, and oil and gas are sealingly contained in the reservoir 4.

A separator tube 20 is externally fitted to both the upper and lower ends of the cylinder 2 via a seal member 19. Further, an annular passage 21 is defined between the cylinder 2 and the separator tube 20. The annular passage 21 is in communication with the cylinder upper chamber 2A via a passage 22 formed through a sidewall at the upper end of the cylinder 2. A small-diameter opening 23 protrudes at a lower portion of the side wall of the separator tube 20. A large-diameter opening 24 is formed through a sidewall of the outer tube 3. The opening 24 is substantially concentric with the opening 23. A damping force generation mechanism 25 is provided at this opening 24.

Further, a controller 100 and various kinds of sensors 101 are connected to the damping force generation mechanism 25.

The sensors 101 include, for example, a lateral acceleration sensor, a vertical acceleration sensor, a longitudinal acceleration sensor, a vehicle speed sensor, a wheel speed sensor, an accelerator sensor, a brake sensor, and a gyroscope. The sensors 101 constitute a running state detector, which detects a running state of a vehicle, such as a vehicle inclination. Further, a status signal of an ignition switch 102, and a status signal of an engine 103 are input into the controller 100. Further, an electric current for control is supplied from a power source 104 to the controller.

Figure 2:
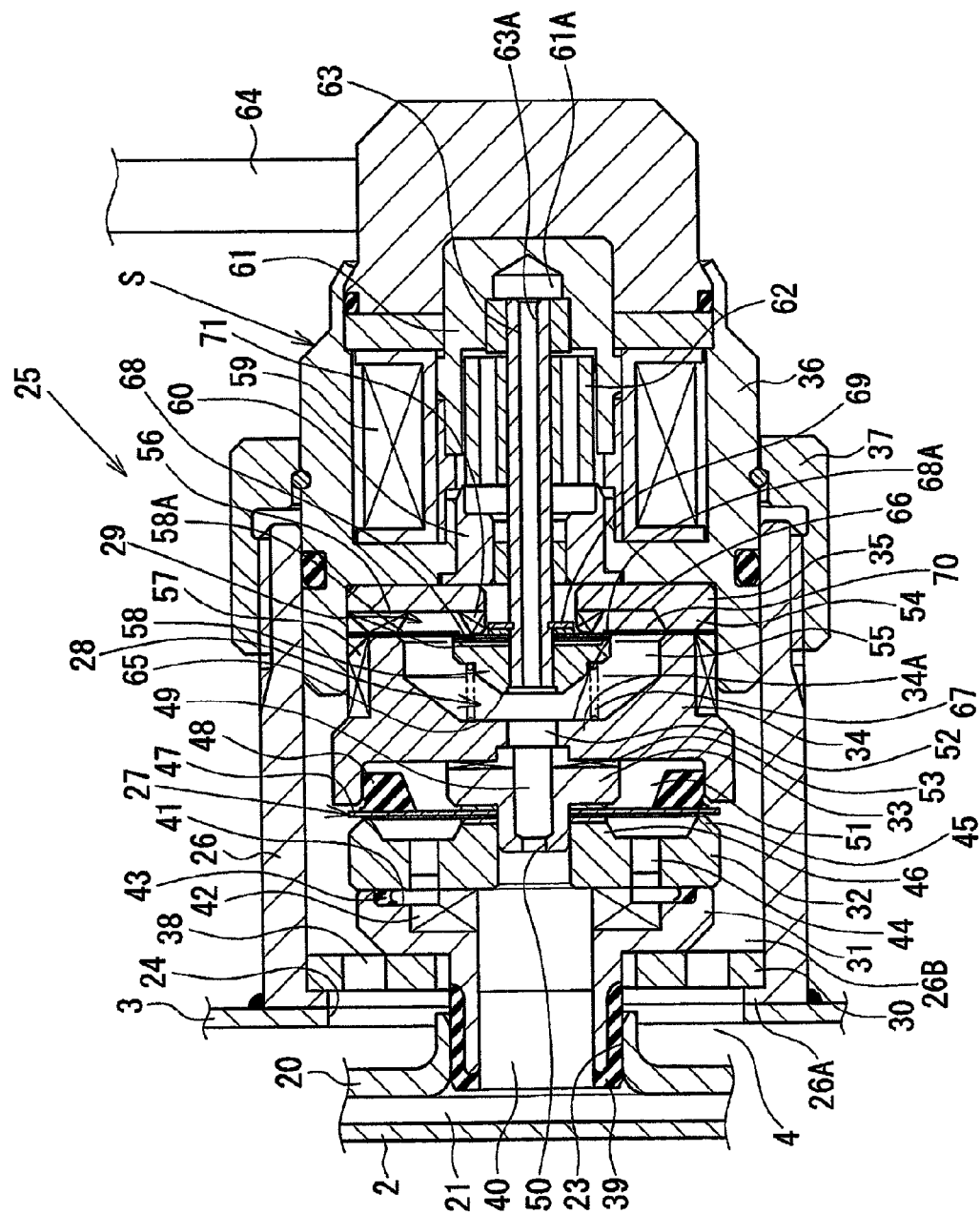
FIG. 2 is a cross-sectional view of a damping force generation mechanism of the damping force adjustable shock absorber illustrated in FIG. 1, illustrating the damping force generation mechanism taken along the axial plane.

As illustrated in FIG. 2, the damping force generation mechanism 25 includes a cylindrical case 26 attached to the opening 24 at the sidewall of the outer tube 3, and a pilot-type (backpressure-type) main valve 27 and a pilot valve 28 contained in the cylindrical case 26. The pilot valve 28 is a pressure control valve that controls a valve opening pressure of the main valve 27 and is configured to be driven by a solenoid. A fail valve 29 is disposed at a downstream side of the pilot valve 28. The fail valve 29 functions when a fail occurs. The following members are inserted in the case 26 in the described order from the opening 24: an annular passage plate 30, a convexed passage member 31, an annular main valve member 32, a convexed orifice passage member 33, a cylindrical pilot valve member 34 having a bottom at an intermediate position thereof, an annular holding member 35, and a cylindrical solenoid case 36. These inserted members are in abutment with each other, and is fixed by coupling the solenoid case 36 to the case 26 by a nut 37.

The passage plate 30 is fixed by abutting against an inner flange 26A formed at an end of the case 26. A plurality of passages 38 extends through the passage plate 30 along an axial direction (a left-right direction illustrated in FIG. 2). The plurality of passages 38 establishes communication between the reservoir 4 and a chamber 26B in the case 26. The passage member 31 includes a small-diameter tip portion extending through the passage plate 30, and a large-diameter shoulder portion in abutment with the passage plate 30, thereby being fixed thereat. The tip portion of the passage member 31 is liquid-tightly fitted in the opening 23 of the separator tube 20 via a seal member 39. A passage 40 axially extends through the passage member 31, and is in communication with the annular passage 21. An annular groove 41 is formed at an end of the large-diameter portion of the passage member 31. The annular groove 41 is in communication with the passage 40 via a radially formed cutout 42.

The main valve member 32 is fixed by abutment of one end of the main valve member 32 against the large-diameter portion of the passage member 31. The abutment portion between the main valve member 32 and the passage member 31 is sealed by a seal member 43 provided in the annular groove 41. Passages 44 axially extend through the main valve member 32. A plurality of passages 44 is formed on a concentric circle around the axis, and is in communication with the annular groove 41 of the passage member 31. An annular seat portion 45 protrudes at the other end of the main valve member 32. The seat portion 45 is located at an outer circumferential side relative to openings of the plurality of passages 44. An annular clamp portion 46 protrudes at an inner circumferential side.

The main valve 27 is constituted by a disk valve 47, and an outer circumferential portion of the disk valve 47 is seated on the seat portion 45 of the main valve member 32. An inner circumferential portion of the disk valve 47 is clamped between the clamp portion 46 and a large-diameter shoulder portion of the orifice communication member 33. An annular slidable seal member 48 is fixedly attached to an outer circumferential portion at a back surface side of the disk valve 47. The convexed orifice passage member 33 includes a small-diameter portion inserted in a central opening of the main valve member 32, and the large-diameter shoulder portion in abutment with the disk valve 47, thereby being fixed thereat. A passage 49 axially extends through the orifice passage member 33. The passage 49 is in communication with the passage 40 of the passage member 31 via a fixed orifice 50 formed at a tip portion of the small-diameter portion.

The pilot valve member 34 has a substantially cylindrical shape with the bottom 34A formed at the intermediate position thereof, and is fixed by abutment of one end of the bottom 34A against the orifice communication member 33. The slidable seal member 48 of the disk valve 47 is slidably and liquid-tightly fitted to an inner circumferential surface of a cylinder portion at one end side of the pilot valve member 34, thereby defining a pilot chamber 51 behind the disk valve 47. The disk valve 47 is opened by receiving a pressure from the direction of the passages 44, as a result of which, communication is established between the passages 44 and the chamber 26B in the case 26 at the downstream side. An inner pressure of the pilot chamber 51 acts on the disk valve 47 in a valve closing direction. A port 52 extends through a center of the bottom 34A of the pilot valve member 34. The port 52 is in communication with the passage 49 of the orifice passage member 33. The pilot chamber 51 is in communication with the passage 49 via a cutout 53 formed at a portion of the orifice passage member 33 that abuts against the bottom 34A of the pilot valve member 34. These cutout 53, passage 49, and fixed orifice 50 constitute an introduction passage for introducing the oil into the pilot chamber 51.

The holding member 35 includes an annular convex 54 formed at an outer circumferential portion at one end side thereof. The annular convex 54 is in abutment with an end of a cylindrical portion at the other end of the pilot valve member 34, whereby the holding member 35 is fixed thereat. Due to this arrangement, a valve chamber 55 is defined within the cylindrical portion of the pilot passage member 34. A cylindrical portion of the solenoid case 36 fitted in the case 26 is fitted around outer circumferential portions of the pilot valve member 34 and the holding member 35, by which the pilot valve member 34 and the holding member 35 are radially positioned. The valve chamber 55 is in communication with the chamber 26B in the case 26 via a cutout 56 formed at the annular convex 54 of the holding member 35 and a cutout 57 formed at the outer circumferential portion of the cylindrical portion of the pilot valve member 34. Then, the pilot chamber 51 is in communication with the chamber 26B at the downstream side of the disk valve 47 (the main valve 27) via the port 52, the valve chamber 55, and the cutouts 56 and 57. A valve body 58 of the pilot valve 28, which is a pressure control valve for opening and closing the port 52, is disposed in the valve chamber 55.

The following members are installed in the solenoid case 36: a coil 59 (a solenoid), cores 60 and 61 inserted in the coil 59, a plunger 62 as a movable element configured to be guided to the cores 60 and 61, and a hollow operating rod 63 coupled to the plunger 62. These members constitute a solenoid actuator S. A tip of the operating rod 63 extends through the holding member 35, and is coupled to the valve body 58 in the valve chamber 55. The solenoid actuator S is configured in such a manner that, when the coil 59 is energized via a lead wire 64, an axial thrust force according to an energization current (a control current) is applied to the plunger 62. The solenoid actuator S does not necessarily have to be configured in such a manner that the operating rod 63 is coupled to the valve body 58, and may be configured in such a manner that the valve body 58 is directly integrally coupled to the plunger 62.

An annular seat portion 65 is formed at a tapered tip of the valve body 58 facing the port 52 of the pilot valve member 34. The seat portion 65 is separated from and is seated on a seat surface 66 as a valve seat around the port 52, thereby opening and closing the port 52. The valve body 58 is biased by a spring force of a valve spring 67 (a compression coil spring) as a biasing unit disposed between the valve body 58 and the bottom 34A of the pilot valve member 34. In a non-energization state with the coil 59 not energized, the valve body 58 is located at a retracted position (a non-energization position) illustrated in FIG. 2, and is in a valve opening state. The valve body 58 advances against the spring force of the valve spring 67 by a thrust force of the plunger 62, which is generated by energizing the coil 59, as a result of which, the seat portion 65 is seated on the seat surface 66 (the valve seat) to close the port 52. Then, the inner pressure of the port 52, i.e., the inner pressure of the pilot chamber 51 can be controlled by controlling the thrust force of the plunger 62, i.e., the energization current (the control current) supplied to the coil 59 to adjust the valve opening pressure.

The hollow operating rod 63 extends through the valve body 58, and when the valve is closed, i.e., the seat portion 65 is seated on the seat surface 66, a passage 63A in the operating rod 63 is opened to the interior of the port 52 to establish communication between the port 52 and a chamber 61A behind the operating rod 63 in the core 61 via the passage 63A, thereby reducing a pressure-receiving area for the pressure in the port 52 applied to the valve body 58 to increase a variable width of the valve opening pressure of the valve body 58 against the thrust force of the plunger 62.

An annular seat portion 58A protrudes at an outer circumferential portion of a back end surface of the valve body 58. An annular seat disk 68 is in abutment with the seat portion 58A. The seat disk 68 is constituted by a single layer or a plurality of layers. An inner circumferential portion of the seat disk 68 is in abutment with a retaining ring 69 attached to the operating rod 63, whereby the seat disk 68 is fixed to the valve body 58. An annular fail disk 70 is clamped at an outer circumferential portion thereof between the end of the cylindrical portion of the pilot valve member 34 and the annular convexed portion 54 of the holding member 35. An outer circumferential edge of the seat disk 68 fixed to the valve body 58 is separated from and is seated on an inner circumferential edge of the fail disk 70, thereby opening and closing a flow passage between the port 52 and the cutout 56 within the valve chamber 55.

An orifice 68A (a cutout) is formed at the outer circumferential edge of the seat disk 68 or the inner circumferential edge of the fail disk 70. The orifice 68A establishes constant communication between the port 52 and the cutout 56. A stopper 71 protrudes at the holding member 35. The stopper 71 limits the retracted position of the valve body 58 by abutting against the seat disk 68. The stopper for limiting the retracted position of the valve body 58 can be provided at another member. Further, the retracted position of the valve body 58 can be also regulated by a position of abutment between the plunger 62 and the core 61.

When the coil 59 is not energized, the valve body 58 is located at the retracted position by the spring force of the valve spring 67. As illustrated in FIG. 2, the seat disk 68 is in abutment with the fail disk 70, closing the flow passage between the port 52 and the cutout 56 within the valve chamber 55. If a pressure of the fluid in a portion of the valve chamber 55 closer to the port 52 increases to reach a predetermined pressure in this state, the fail disk 70 is deflected, and is separated from the seat disk 68 after the retracted position of the valve body 58 is limited by the stopper 71, thereby opening the flow passage between the port 52 and the cutout 56. As a result, a predetermined damping force stronger than the weakest damping force in pressure control is generated, when the coil 59 is not energized.

On the other hand, in such a state that the seat portion 65 of the valve body 58 is seated on the seat surface 66 due to energization of the coil 59, i.e., in such a state that the valve opening pressure is controlled by the pilot valve 28, the seat disk 68 is separated from the fail disk 70, thereby establishing communication of the flow passage between the port 52 and the cutout 56 in the valve chamber 55 via an opening at a center of the fail disk 70.

The damping force adjustable shock absorber 1 is mounted between a sprung side and an unsprung side of the suspension apparatus of the vehicle, and the lead wire 64 is connected to the controller mounted on the vehicle.

Next, an operation of the above-described damping force adjustable shock absorber 1 will be described.

In a normal operation state (during normal control), the coil 59 is energized, and the seat portion 65 of the valve body 58 is seated on the seat surface 66, thereby performing pressure control by the pilot valve 28.

During an extension stroke of the piston rod 6, a movement of the piston 5 in the cylinder 2 causes the check valve 13 of the piston 5 to be closed. Before the disk valve 14 is opened, the fluid in the cylinder upper chamber 2A is pressurized. Thus the fluid is transmitted through the passage 22 and the annular passage 21, and is introduced into the passage 40 formed at the passage member 31 of the damping force generation mechanism 25 from the opening 23 of the separator tube 20. At this time, fluid according to a movement amount of the piston 5 is introduced from the reservoir 4 into the cylinder lower chamber 2B by opening the check valve 17 of the base valve 10. Once the pressure in the cylinder upper chamber 2A reaches the valve opening pressure of the disk valve 14 of the piston 5, the disk valve 14 is opened to release the pressure in the cylinder upper chamber 2A to the cylinder lower chamber 2B, thereby preventing an excessive pressure increase in the cylinder upper chamber 2A.

At the damping force generation mechanism 25, the fluid introduced from the passage 40 of the passage member 31 is transmitted through the fixed orifice 50 of the orifice passage member 33, the passage 49, and the port 52 of the pilot valve member 34, and is introduced into the valve chamber 55 by pushing and opening the valve body 58 of the pilot valve 28, before the disk valve 47 of the main valve 27 is opened (in a low piston speed region). Further, the fluid is conveyed into the reservoir 4 through the opening of the fail disk 70, the cutout 56 of the holding member 35, the cutout 57 of the pilot valve member 34, the chamber 26B in the case 26, and the passage 38 of the passage plate 30. Then, when the piston speed increases, and the pressure in the cylinder upper chamber 2A reaches the valve opening pressure of the disk valve 47, the fluid introduced into the passage 40 is transmitted through the cutout 42, the annular groove 41, and the passages 44, and is directly conveyed into the chamber 26B in the case 26 by pushing and opening the disk valve 47.

On the other hand, during a compression stroke of the piston rod 6, a movement of the piston 5 in the cylinder 2 causes the check valve 13 of the piston 5 to be opened while causing the check vale 17 in the passage 15 of the base valve 10 to be closed. Before the disk valve 18 is opened, the fluid in the cylinder lower chamber 2B is introduced into the cylinder upper chamber 2A, and the fluid is transmitted from the cylinder upper chamber 2A to the reservoir 4 via the same route as the one during the extension stroke by an amount corresponding to an entry of the piston rod 6 into the cylinder 2. Once the pressure in the cylinder lower chamber 2B reaches the valve opening pressure of the disk valve 18 of the base valve 10, the disk valve 18 is opened to release the pressure in the cylinder lower chamber 2B into the reservoir 4, thereby preventing an excessive pressure increase in the cylinder lower chamber 2B.

As described above, at the damping force generation mechanism 25, before the disk valve 47 of the main valve 27 is opened (in the low piston speed region), a damping force is generated by the fixed orifice 50 and the valve opening pressure of the valve body 58 of the pilot valve 28. After the disk valve 47 is opened (in a high piston speed region), a damping force is generated according to the opening degree of the disk valve 47. The damping force can be directly controlled regardless of the piston speed, by adjusting the valve opening pressure of the pilot valve 28 by the energization current (the control current) supplied to the coil 59. The inner pressure of the pilot chamber 51, which is in communication with the passage 49 at an upstream side of the pilot valve 28, changes depending on the valve opening pressure of the pilot valve 28, and this inner pressure of the pilot chamber 51 is applied in a direction causing the disk valve 47 to be closed. Therefore, controlling the valve opening pressure of the pilot valve 28 can realize adjustment of the valve opening pressure of the disk valve 47 at the same time, thereby increasing the adjustment range of the damping force characteristic.

Reducing the energization current (the control current) supplied to the coil 59 to reduce the thrust force of the plunger 62 leads to a reduction in the valve opening pressure of the pilot valve 28, thereby generating a soft-side damping force. On the other hand, increasing the energization current to increase the thrust force of the plunger 62 leads to an increase in the valve opening pressure of the pilot valve 28, thereby generating a hard-side damping force. Therefore, a soft-side damping force, which is generally frequently used, can be generated by a low current, whereby the power consumption can be reduced.

Further, for the specification expected to generate a further weaker soft-side damping force, the seat portion 65 of the valve body 58 may be constantly separated from the valve seat 66 to open the valve when a soft-side energization current is supplied. In this case, the intended effect can be obtained by separating the seat portion 65 from the valve seat 66 by only an extremely slight separation amount (approximately 0.5 mm), and the seat portion 65 is not separated to reach the retracted position (the non-energization position).

In a normal control state, the valve body 58 moves between a position where an opening area defined by the seat portion 65 of the valve body 58 and the valve seat 66 is equal to the fixed orifice 50, and a position where the seat portion 65 is seated on the valve seat 66. This region is referred to as a normal operation region. A region where the seat portion 65 is separated from the valve seat 66 beyond the normal operation region is referred to as a non-normal operation region.

Further, when the thrust force of the plunger 62 is lost due to occurrence of a fail such as disconnection of the coil 59 and a failure of the controller, the valve body 58 is retracted by the spring force of the valve spring 67 from the normal operation region to the retracted position (non-energization position) in the non-normal operation region illustrated in FIG. 2, thereby opening the port 52. Consequently, the seat disk 68 of the valve body 58 is placed into abutment with the fail disk 70 to close the flow passage between the port 52 and the cutout 56 in the valve chamber 55. In this state, the flow of the fluid from the port 52 to the cutout 56 in the valve chamber 55 is controlled by the fail valve 29, i.e., the orifice 68A and the fail disk 70. Therefore, it is possible to generate a required damping force, and at the same time, adjust the inner pressure of the pilot chamber 51, i.e., the valve opening pressure of the main valve 27, according to the settings of the flow passage area of the orifice 68A and the valve opening pressure of the fail disk 70. As a result, it is possible to acquire, for example, a damping force corresponding to a passive damper, even when a fail occurs.

Next, a description will be provided of control by the controller of the suspension control apparatus according to the present invention, and more specifically, control of the control current for controlling a damping force generated by the damping force generation mechanism 25 equipped with the fail-safe mechanism.

Figure 3:
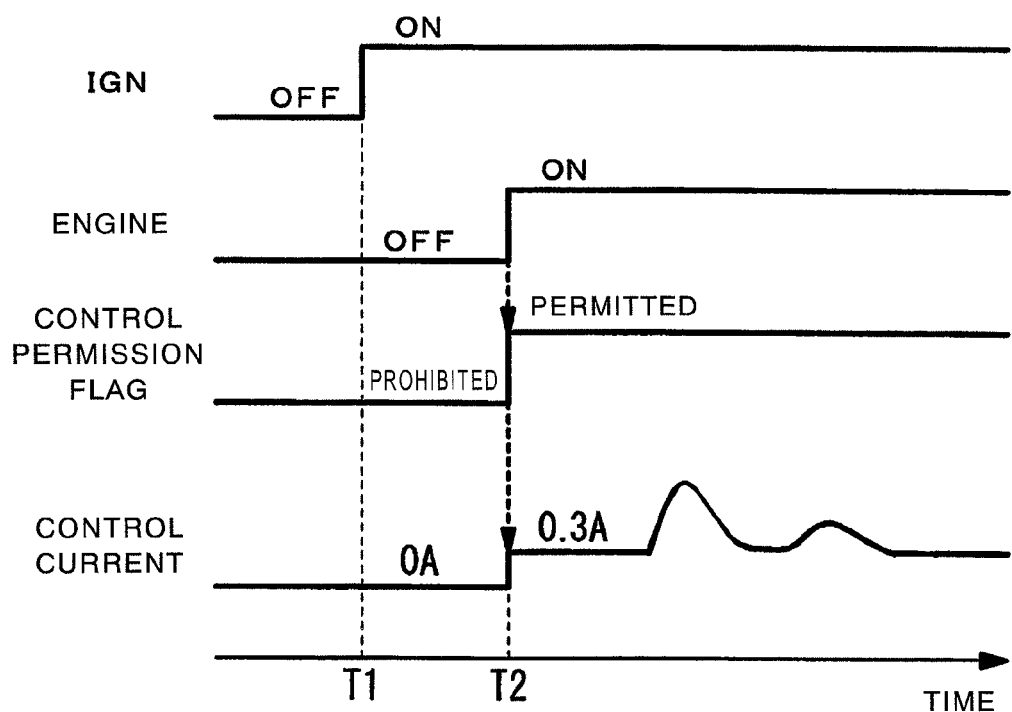
FIG. 3 illustrates control of a control current by a controller according to an exemplary related art.

First, for reference, an exemplary conventional technique will be described with reference to FIG. 3. FIG. 3 is a conventional example of a time chart illustrating control when the controller is started up. As illustrated in this time chart, first, the ignition is turned on at timing T1. After that, the engine is started at timing T2, according to which, the controller is started up by a power source controller (a power source unit) at the same timing, i.e., timing T2. Further, this triggers a raise of a flag that permits control of a damping force (hereinafter referred to as a control permission flag) at timing T2. The controller immediately switches the control current from 0 ampere to a current value (0.3 ampere) for generating a damping force of the soft characteristic (S/S).

[First Control]

Figure 4:
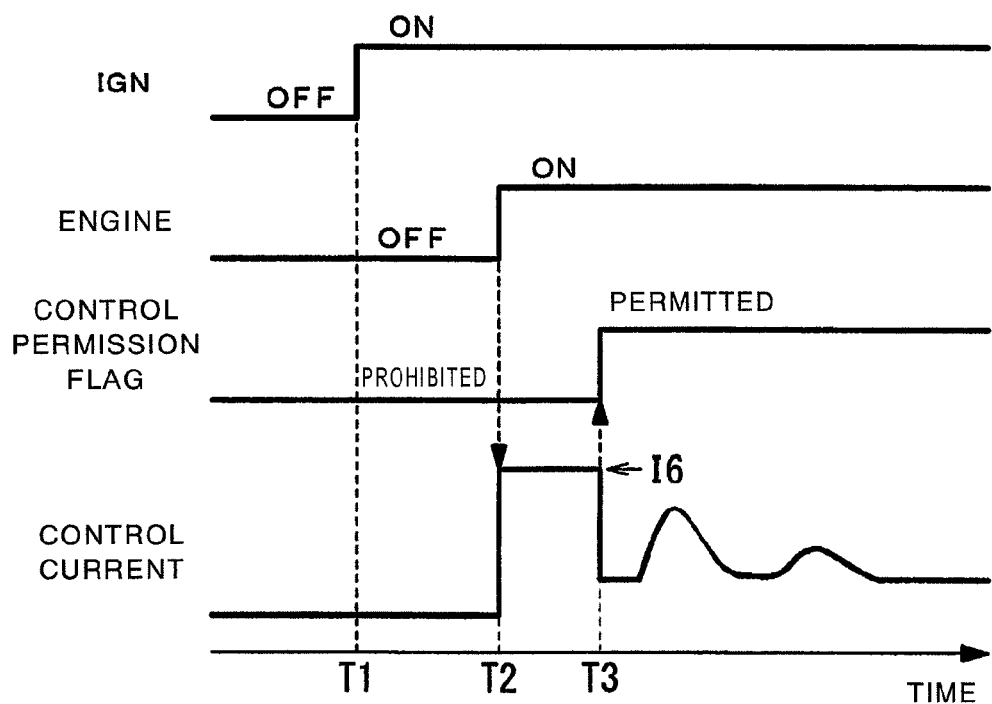
FIG. 4 illustrates control of a control current by a controller in first control according to the embodiment of the present invention.

On the other hand, according to the embodiment of the present invention, as illustrated in FIG. 4, the ignition is turned on at timing T1. After that, the engine is started at timing T2, according to which, the controller is started up by the power source controller (the power source unit) at the same timing, i.e., timing T2. This is referred to as a start of an operation of the vehicle in the present invention. After the controller is started up by the power source controller (the power source unit), the controller switches the control current from 0 ampere to a maxim current value I6 (refer to FIG. 7) at the same time as the startup, i.e., at timing T2. After the controller maintains the control current at the maximum current value I6 for a predetermined time, at timing T3, the controller switches the control current to 0.3 ampere, which is a current value required to maintain the damping force characteristic of the soft characteristic (S/S), i.e., a minimum current value required to maintain the valve spring 67 in a compressed state so that the seat portion 65 is in abutment with the valve seat 66 (hereinafter referred to as a normal control minimum current value). Then, the control permission flag is raised at timing T3, i.e., at the timing when the control current is switched from the maximum current I6 to the normal control minimum current value, i.e., 0.3 ampere. This control is performed as initialization control.

For the specification expected to generate a further weaker soft-side damping force, the normal control current value switched at timing T3 may be a current value required to maintain a position in the normal control region where the pilot valve 28 is a slightly opened to maintain the damping force characteristic of the soft characteristic (S/S), instead of maintaining the valve spring 67 in a completely compressed state.

Figure 5:
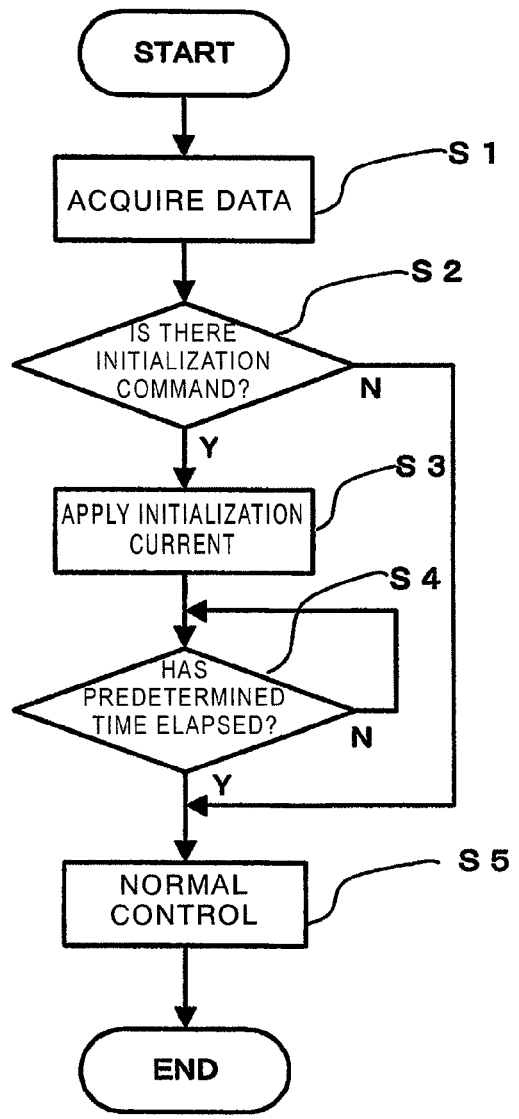
FIG. 5 is a flow chart illustrating the control by the controller according to the embodiment of the present invention.

Next, a flow of the initialization control according to the embodiment of the present invention will be described with reference to FIG. 5.

After a start of the control, in step S1, data such as an initialization command and a required damping force is input. After that, in step S2, it is determined whether an initialization command flag is raised. In the present first control, the initialization command flag is raised when the engine is started.

In step S3, an initialization current, i.e., the maximum current value I6 is applied to the coil 59. Then, in step S4, it is determined whether the predetermined time has elapsed, and the maximum current value I6 is maintained until the predetermined time has elapsed. After that, when the predetermined time has elapsed, the processing proceeds to step S5. In step S5, the normal control starts. According to the first control, the vehicle is not running yet when the normal control starts, whereby the damping force is adjusted to the soft characteristic, so that the control current is set to the normal control minimum current I1. The processing from step S2 to step S5 corresponds to the initialization control according to the present invention.

In this way, after the controller 100 is started up by the power source controller (the power source unit 104), the controller switches the control current from 0 ampere to the maximum current value I6 at the same time as the startup. Therefore, even when the hysteresis of the damping force characteristic is large relative to the control current, the valve body 58 can be displaced to the normal operation region, whereby the damping force characteristic can be securely changed to the soft characteristic (S/S), which is a damping force when the vehicle is at a stop.

Figure 7:
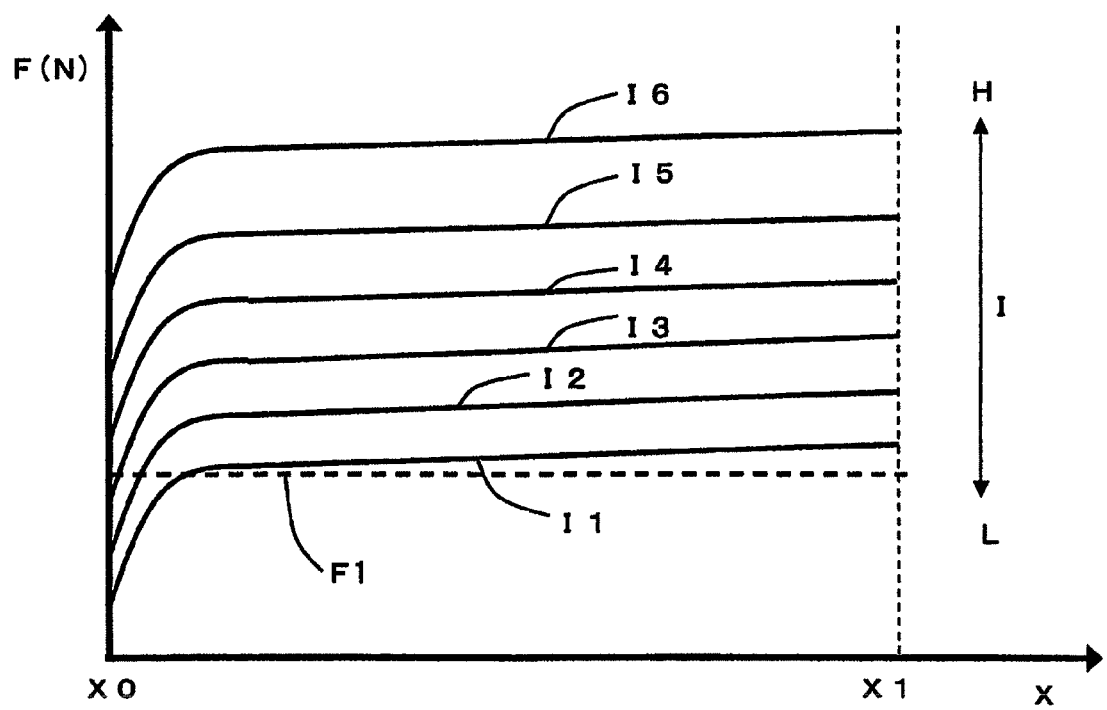
FIG. 7 is a correlation diagram illustrating a relationship among a stroke position of a plunger, a thrust force of the plunger, and the control current.
Figure 8:
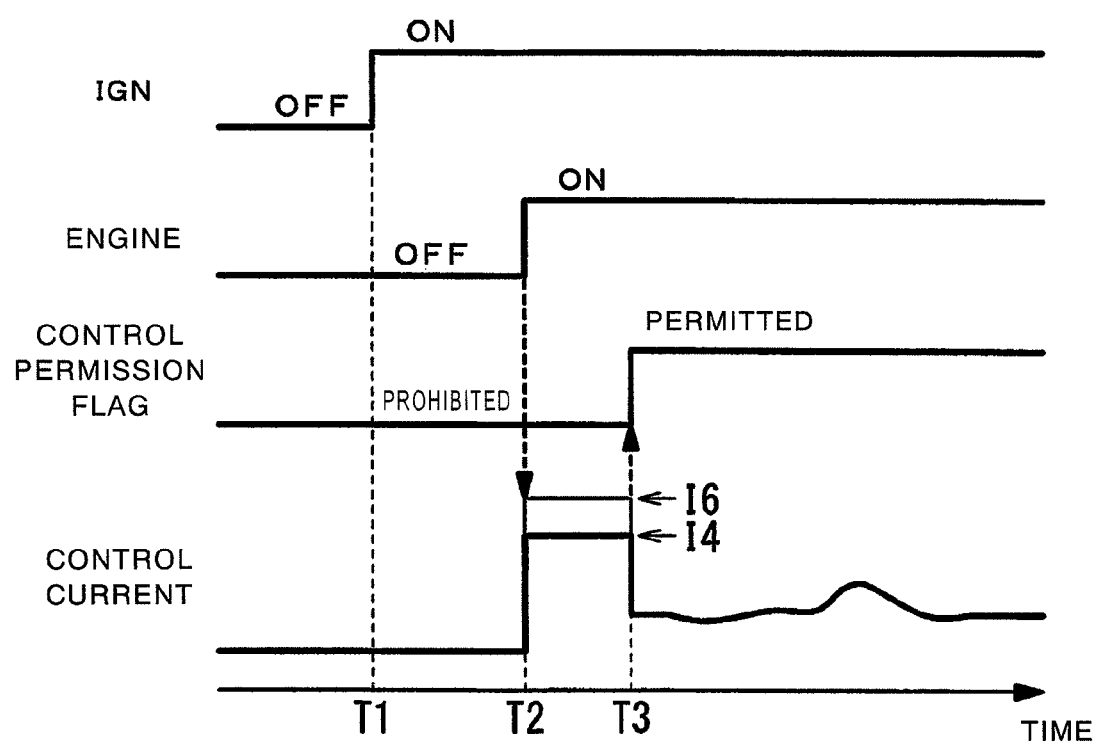
FIG. 8 illustrates control of the control current by the controller before a vehicle starts running according to an exemplary modification of the first control.

This is because the plunger 62 is maximally separated from the core 60 when the valve body 58 is located at the retracted position (X0), whereby the thrust force reduces relative to the applied current as illustrated in FIG. 7.

Referring now to FIG. 7, a vertical axis represents the thrust force F (N), and a horizontal axis represents the position X of the pilot valve 28. Solid lines represent relationships between the position of the pilot valve 28 and the thrust force F according to an increase in the control current I from I1 to I6. A broken line labeled as F1 in FIG. 7 represents the thrust force required form the pilot valve 28 to move from the retracted position (X0). A point X1 in FIG. 7 represents the position where the seat portion 65 of the pilot valve 28 abuts against the valve seat 66.

This graph reveals that at least a current of approximately I4 is required for the pilot valve 28 to move from the retracted position (X0).

Figure 6:
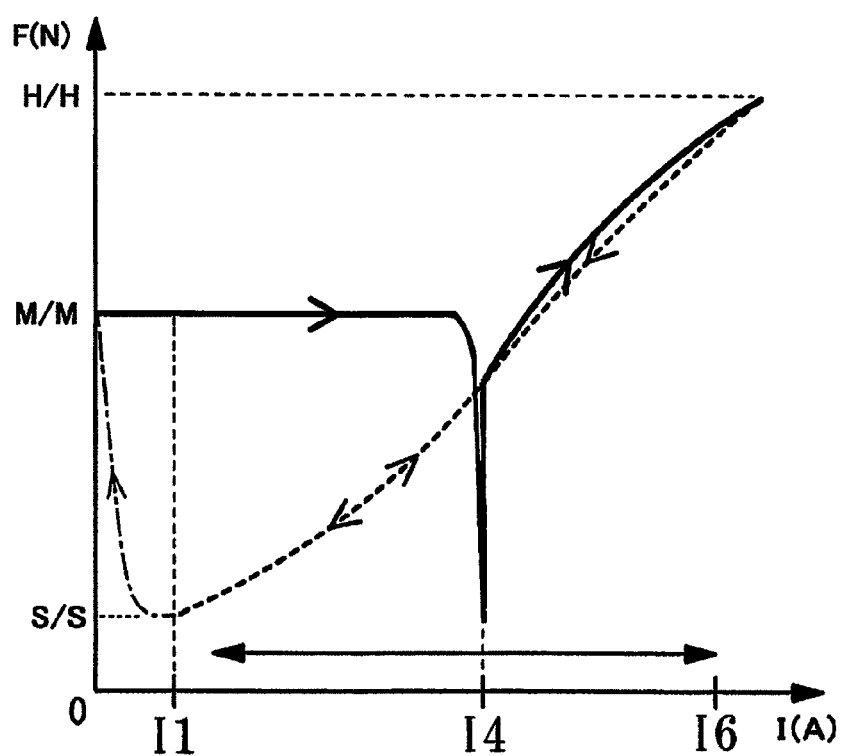
FIG. 6 is a correlation diagram illustrating a relationship between the control current and a damping force characteristic.

Therefore, it becomes possible to make the best use of a proportional region in a correlation diagram between the control current (I) and the damping force (F) illustrated in FIG. 6 (a region indicated by a broken line between I1 to I6 in FIG. 6, where the line is slightly non-linear but can be regarded as being substantially linear), and therefore possible to increase the adjustable width of the damping force characteristic in the normal control. Further, execution of the initialization control (a solid line in FIG. 6) ensures a shift from a power-off fail-safe state (M/M) to the normal control state. Therefore, it is possible to avoid generation of an unnecessary damping force with the vehicle running while remaining in the fail-safe state (M/M), and therefore possible to reduce an upward thrust and tension on a bad road surface or the like, achieving both a ride comfort of the vehicle and a fail-safe architecture.

The controller switches the current value at timing T3, after maintaining the control current at the maximum current value I6 for the predetermined time. The predetermined time can be a time required for the valve body 58 to axially move from a maximum valve opening position, which is the fail position, and the control current does not necessarily have to be maintained at the maximum current value I6 while the valve spring 67 is maintained in the compressed state. Further, after maintaining the maximum current value I6, the controller switches the control current to the normal control current value 0.3 ampere minimally required to maintain the valve spring 67 in the compressed state. However, the controller may switch the control current to a current value capable of achieving a desired damping force characteristic according to a condition of a road surface and a condition of the vehicle, instead of the required minimum current value.

In such a damping force adjustable hydraulic shock absorber, the solenoid actuator S is expensive, and it is important to reduce an output of the solenoid actuator S for the purpose of a cost reduction. However, the reduction in an output of the solenoid actuator S causes the following problem. Especially, if the solenoid actuator S is configured in such a manner that a stronger damping force than the soft damping force is generated at the retracted position with the coil 59 not energized, like the above-described fail-safe architecture, the pilot vale 28 may be displaced to the retracted position according to an increase in the piston speed when the damping force is set to the soft characteristic. Therefore, the stroke of the pilot valve 28 (the normal operation region) should be extended to some degrees. Therefore, the solenoid should be used even around the position X0, and a low current such as I1 cannot displace the pilot valve 28 due to the hysteresis, like the present embodiment. However, use of the above-described first control can solve this problem. The above-described embodiment can provide a suspension apparatus capable of acquiring a characteristic at the time of a fail even with use of an affordable low-output solenoid. It should be noted that this problem does not occur if the solenoid is used in a stroke range with a small hysteresis, like the exemplary conventional technique, or if the solenoid can provide a large output.

[Exemplary Modification of First Control]

According to the above-described first control, when the controller is started up by the power source controller (the power source unit), the controller switches the control current from 0 ampere to the maximum current value I6, whereby the plunger 62 advances with a maximum thrust force. As a result, an impact noise may be generated from the pilot valve 28 due to a collision between the valve body 58 and the bottom 34A of the pilot valve member 34. Therefore, according to the present exemplary modification, when the controller is started up by the power source controller (the power source unit), the controller switches the control current from 0 ampere to a control current (I4 in FIG. 7) for acquiring a minimum thrust force of the plunger 62 required to release the fail-safe state regardless of the stroke position.

As a result, the plunger 62 advances with a minimum thrust force required for the pilot valve 28 to move from the retracted position (X0), whereby it is possible to reduce an impact noise generated by a collision between the valve body 58 and the bottom 34A of the pilot valve member 34.

Next, a description will be provided of control when the vehicle starts running according to the exemplary modification of the first control.

Figure 9:
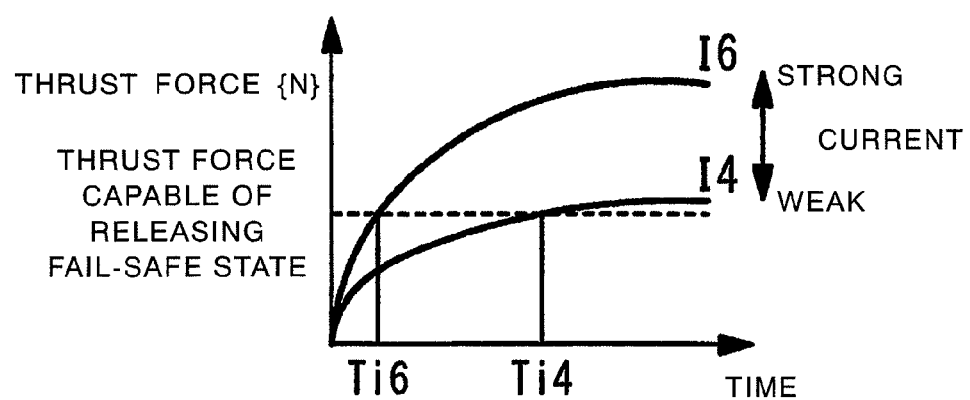
FIG. 9 is a correlation diagram illustrating a relationship between an elapsed time from issue of an instruction about the control current by the controller, and the thrust force of the plunger.

FIG. 9 is a correlation diagram illustrating a relationship between the time elapsed from issue of an instruction about the control current, and the thrust force of the plunger 62. This diagram reveals that a time (hereinafter referred to as a reach time) until the thrust force of the plunger 62 reaches a thrust force required for the pilot valve 28 to move from the retracted position (X0) (a thrust force required to release the fail-safe state (a broken line in FIG. 9)) varies depending on the instructed control current, and this reach time reduces according to an increase in the instructed control current. The diagram indicates that a reach time T16 corresponding to the control current (the maximum current value) I6 is not more than one fourth of a reach time T14 corresponding to the control current I4.

In the above-described control before the vehicle starts running according to the exemplary modification of the first control, if the vehicle starts running at timing Ti4 before the thrust force of the plunger 62 reaches the thrust force required for the pilot valve 28 to move from the retracted position (X0), i.e., at a timing before the damping force characteristic completes its shift from the fail-safe state (M/M) to the soft characteristic (S/S), anti-squat control cannot be provided in time, so that the ride quality may be deteriorated.

Figure 10:
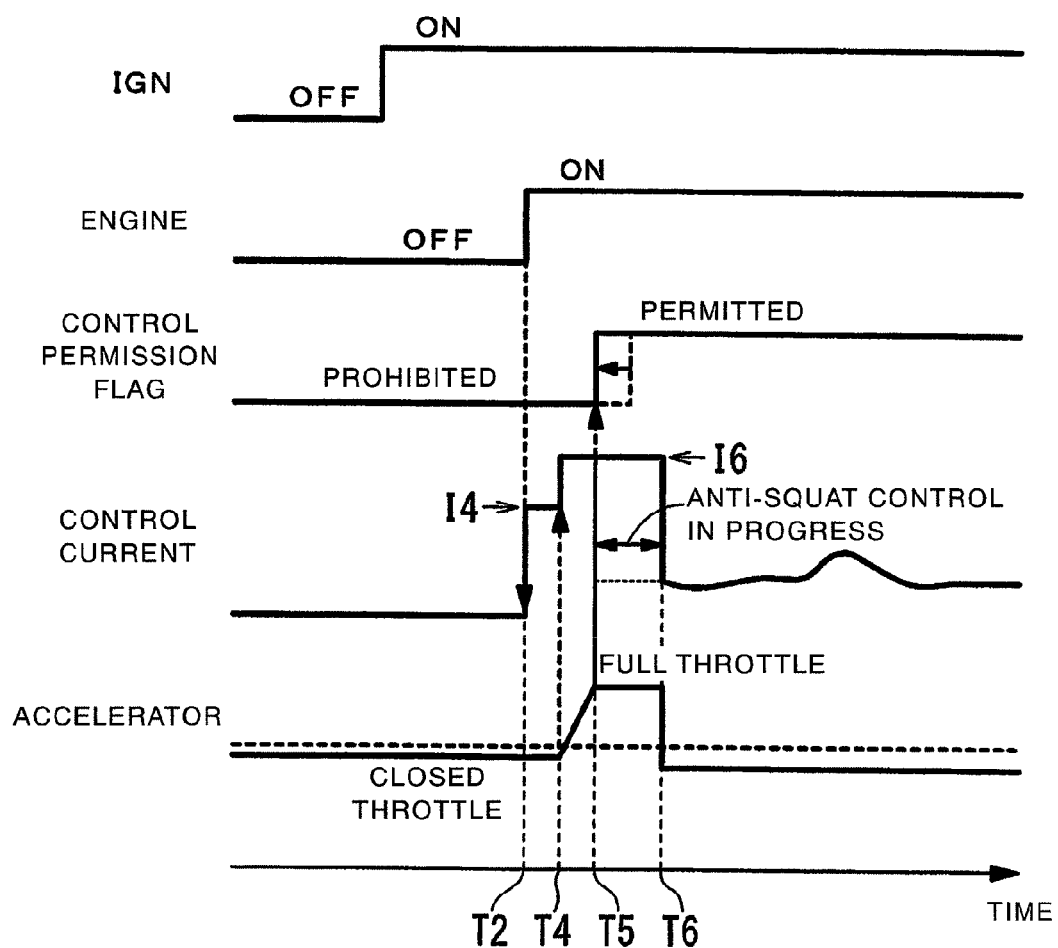
FIG. 10 illustrates control of the control current by the controller when the vehicle has started running according to the exemplary modification of the first control.

Therefore, the exemplary modification of the first control operates before the vehicle starts running in the following manner. When the controller is started up by the power source controller (the power source unit), the controller switches the control current from 0 ampere to I4. However, if it is detected at timing T4 illustrated in FIG. 10 that the vehicle has started running (has set off) according to, for example, such detection during the period from timing T2 to timing T3 illustrated in FIG. 10 that an accelerator opening degree monitoring unit (a vehicle state monitoring unit) of the vehicle detects that an accelerator is operated, the controller switches the control current from the current value I4 to the maximum current value I6, as illustrated in FIG. 10. By this control, the controller quickly changes the damping force characteristic to the hard characteristic (H/H) or a desired characteristic.

Then, when the accelerator opening degree monitoring unit (the vehicle state monitoring unit) 101 detects at timing T5 illustrated in FIG. 10 that, for example, the accelerator is now at full throttle, the control permission flag is raised, and the controller performs anti-squat control while the accelerator is maintained at full throttle (a period from T5 to T6 illustrated in FIG. 10). This control can realize quick execution of anti-squat control, and therefore can reduce a change in the driver's posture to improve the operation stability.

[Second Control]

Next, second control will be described with reference to FIG. 11. The second control is provided together with the above-described first control and the exemplary modification of the first control in the present embodiment, and is performed while the vehicle is running.

According to the suspension control apparatus of the present invention, the pilot valve 28 may be retracted to the retracted position (X0) if the piston speed exceeds an upper limit value (an allowable upper limit), depending on an output of the solenoid valve and a setting of the stroke. As a result, the damping force characteristic is set into the fail-safe state (M/M). In this case, an unnecessary damping force may be generated, and the ride quality may be deteriorated. Therefore, according to the second control, if the damping force characteristic shifts to the fail-safe state (M/M) due to the piston speed, the control current is increased after the piston speed is stabilized, so as to quickly recover the damping force characteristic from the fail-safe state (M/M), thereby improving the ride quality.

Figure 11:
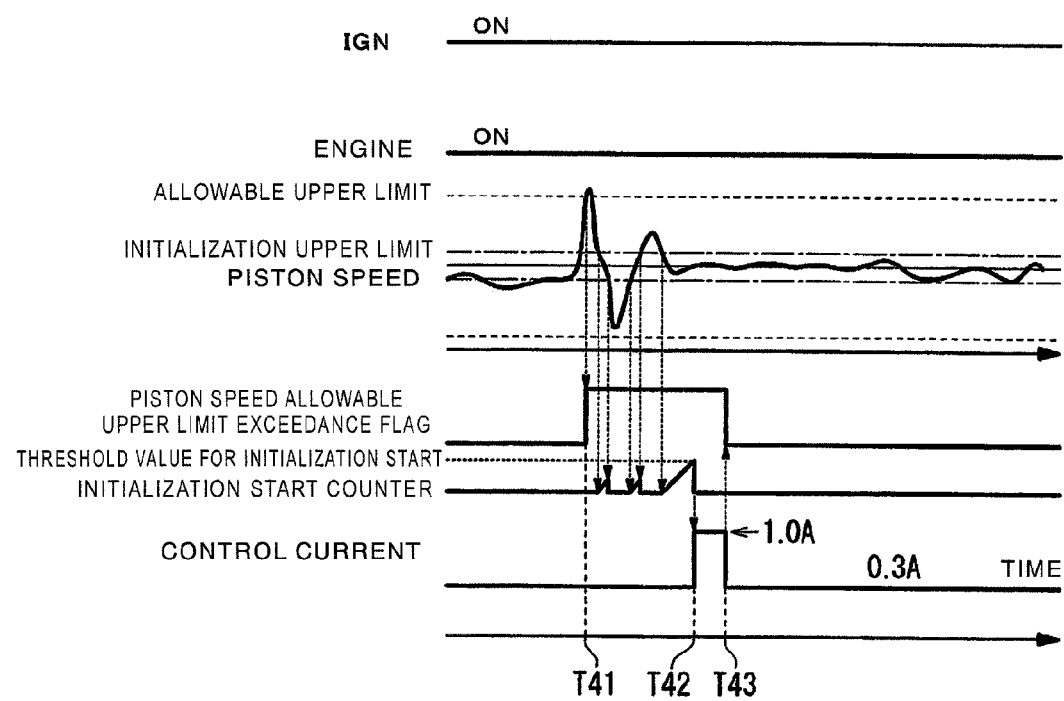
FIG. 11 illustrates control of the control current by the controller in second control.

FIG. 11 is a time chart illustrating control by the controller according to the second control. As illustrated in FIG. 11, in the normal control state, when it is detected that the piston speed exceeds the upper limit value at timing T41, this triggers a raise of a piston speed allowable upper limit exceedance flag, and an initialization start counter starts counting how many times the piston speed exceeds an initialization upper limit. During this time, if the initialization start counter finishes the counting without the piston speed exceeding the upper limit value again, an initialization flag is raised at timing T42 corresponding to this finish of the counting. Accordingly, the controller performs the initialization control according to the flow illustrated in FIG. 5. As a result, even if the valve body 58 is displaced into the non-normal operation region, the valve body 58 can be securely returned to the normal operation region to allow the normal control to be performed, thereby improving the ride quality.

As illustrated in FIG. 11, after a predetermined time has elapsed from switching the control current at timing T42, the controller reduces the control current to the minimum current value 0.3 ampere at timing T43, and lowers the piston speed allowable upper limit exceedance flag at the same time. This is because a current of, for example, 1.0 ampere is required to compress the spring 67 of the pilot valve 28 from the extended state (the fail-safe state), but a current of 0.3 ampere (the minimum current value) is enough to maintain the spring 67 in the compressed state. According this control, the power consumption of the system can be reduced. In the second control, the piston speed can be acquired by not only directly measuring it but also estimating it from an unsprung acceleration or sprung acceleration, or the status of the damping force.

Further, the control may be returned to the normal control without temporarily switching the control current to a current of 0.3 ampere (the minimum current value) immediately after the initialization control.

[Third Control]

Figure 12:
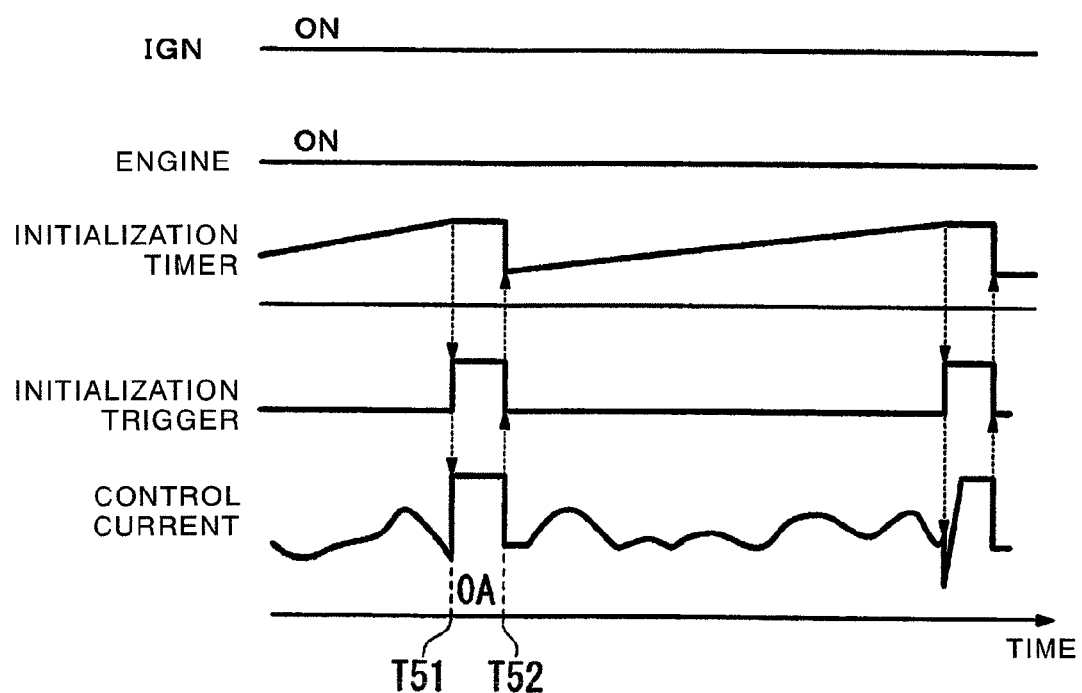
FIG. 12 illustrates control of the control current by the controller in third control.

Next, third control will be described with reference to FIG. 12. The third control is provided together with the above-described first control, the exemplary modification of the first control, and the second control in the present embodiment, and is performed while the vehicle is running.

The third control is configured in such a manner that the control current is periodically controlled to generate a damping force according to the normal control. As illustrated in FIG. 12, according to the third control, in the normal control state, when an initialization timer finishes the counting at timing T51, an initialization trigger is turned on at the same time. While the initialization trigger is kept in an ON state, the controller switches the control current to, for example, the above-described maximum current value I6 or the current value I4 instructed in the second embodiment, and maintains it. As a result, even if the damping force characteristic is set into the fail-safe state (M/M) unexpectedly, the suspension apparatus can change the damping force characteristic to the soft characteristic (S/S) periodically, and therefore can improve the ride quality with the normal control without allowing the fail-safe state (M/M) to continue.

Instead of controlling the control current periodically, the suspension control apparatus may be configured in such a manner that a running distance monitoring unit (a vehicle body signal detector) monitors the running distance of the vehicle, and the initialization control is performed every time the running distance reaches a predetermined distance, so as to generate a damping force according to the normal control.

[Fourth Control]

Next, fourth control will be described with reference to FIG. 13. The fourth control is provided together with the above-described first control, the exemplary modification of the first control, the second control, and the third control in the present embodiment, and is performed while the vehicle is running.

According to the fourth control, a vehicle speed sensor 101 as a vehicle speed monitoring unit (a running state detector) monitors the speed of the vehicle. If the vehicle speed sensor 101 detects that the vehicle is at a stop, the control current is reduced to a current value smaller than the minimum current value 0.3 ampere. When it is detected that the vehicle starts running based on the opening degree of the accelerator, the initialization flag is raised, whereby the controller performs the initialization control according to the flow illustrated in FIG. 5 to generate a damping force of the soft characteristic (S/S).

Figure 13:
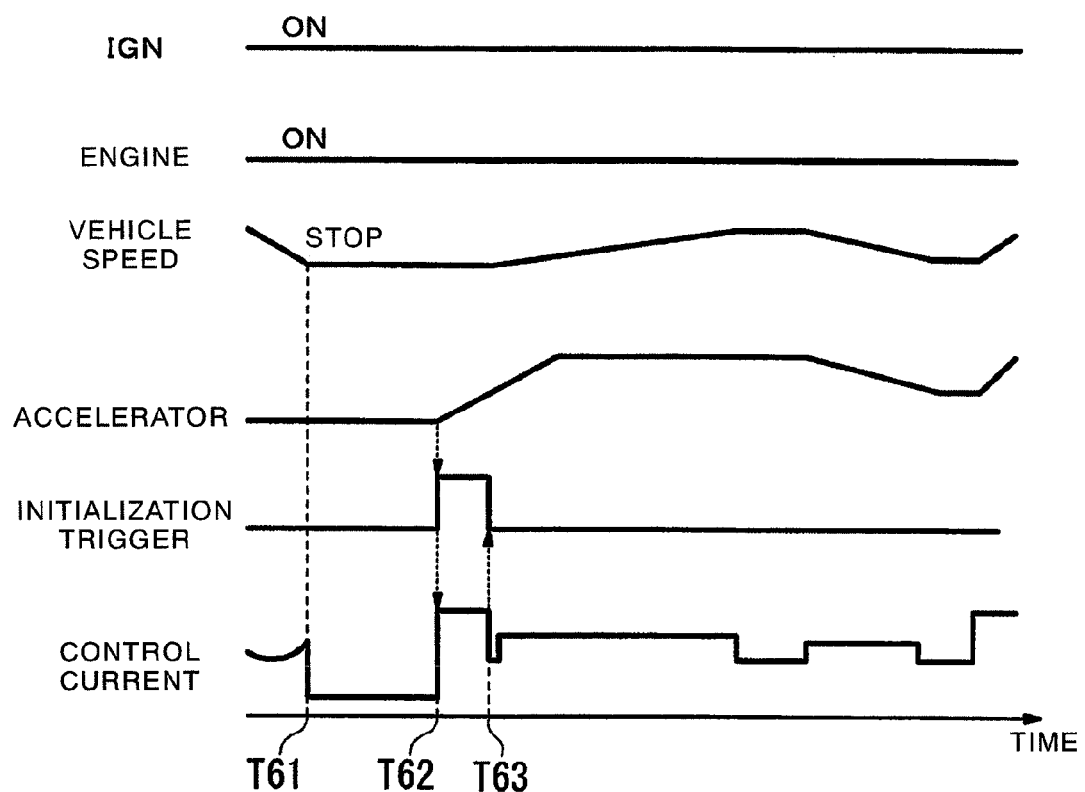
FIG. 13 illustrates control of the control current by the controller in fourth control.

As illustrated in FIG. 13, according to the fourth control, in the normal control state, when the vehicle speed sensor 101 detects at timing T61 that the vehicle is at a stop, the controller reduce the control current to a current value smaller than the minimum current value 0.3 ampere. Then, when an operation to the accelerator is detected at timing T62, the initialization trigger is turned on. While the initialization trigger is in the ON state, the controller performs the initialization control, according to which the controller switches the control current to, for example, the maximum current value I6 or I4 and maintains it. As a result, the power consumption of the system can be reduced.

The vehicle speed sensor or brake sensor may be used as the detector for detecting that the vehicle has started running, instead of detecting it based on an operation applied to the accelerator.

As well known to people skilled in the art, a control valve (the pilot valve 28) equipped with a fail-safe mechanism is subject to an increase in the hysteresis due to, for example, a change over time and a temperature increase. Therefore, in consideration of this increase in the hysteresis according to a change over time and a temperature increase, the present embodiment measures temperatures with use of an ambient temperature sensor and a hydraulic temperature sensor 101 of the hydraulic shock absorber, and determines the current value of the control current used by the controller 100 in the initialization control in the above-described respective kinds of control. As a result, the present embodiment can adapt to a change of the characteristic of the solenoid actuator S to improve the robustness.

At this time, for example, under such an environment that the ambient temperature is low, this hinders the operation of the valve body, whereby it is desirable to employ control using a current value larger than I6. On the other hand, under such an environment that the ambient temperature is high, the valve body can operate smoothly, whereby it is desirable to employ control using a current value smaller than I4.

Further, even if the vehicle body signal detector detects that the damping force characteristic is in the fail-safe state, the controller does not perform the control described in the above description of the present embodiment, i.e., does not perform the control for switching the control current to a current value to achieve the soft characteristic, if it is detected that another control such as roll control is in progress, since a current value corresponding to the soft characteristic such as 0.3 ampere reduces the safety in this case.

The above-described embodiment has been described based on an example that combines the above-described first control to fourth control. However, the present embodiment may use each control independently, and may combine only required types of control to use them.

Further, the above-described embodiment has been described based on an example that includes a fail-safe valve. However, the present embodiment is not limited thereto, and may lack a fail-safe valve. Further, using a non-linear spring (with a spring constant increasing according to compression) as the spring 67 can reduce the hysteresis, thereby further reducing the initialization current and allowing the solenoid actuator to work well with a small output of the solenoid.

The above-described embodiment has been described using a pilot control type damping valve. However, the present invention is not limited thereto, and may be employed to a suspension control apparatus that directly controls a damping valve. However, using a pilot control type damping valve can increase the adjustable width of the damping force with a small output.

Further, the type of the damping force adjustable shock absorber is also not limited to the one used in the above-described embodiment. For example, the damping force adjustable mechanism may be provided at the piston portion.

Further, the normal control in the present invention may be embodied by any control such as Sky-Hook control, and H-infinity control (H-infinity control theory).

Reference Signs List 1 damping force adjustable shock absorber
28 pilot valve
100 controller
101 sensor (running state detector)

The invention claimed is:

1. A suspension control apparatus comprising:
a damping force adjustable shock absorber disposed between a body and each wheel of a vehicle, the damping force adjustable shock absorber being capable of adjusting a damping force characteristic by adjustment of a control current to be supplied to a solenoid;
a running state detector adapted to detect a running state of the vehicle; and
a controller adapted to calculate a damping force that the controller causes the damping force adjustable shock absorber to generate based on a detection result of the running state detector, and determine a current value of the control current based on a result of the calculation, thereby performing normal control,
wherein the damping force adjustable shock absorber is adapted to generate a hard characteristic by a current value larger than a current value of the control current corresponding to a soft characteristic,
wherein the controller performs initialization control, according to which the controller switches the control current to a current value larger than the current value for instructing the damping force of the soft characteristic, and after that, performs the normal control,
wherein the damping force adjustable shock absorber includes a movable element adapted to be moved by the solenoid, a valve body disposed at the movable element and adapted to be separated from and seated on a valve seat facing the valve body, and a biasing unit adapted to bias the valve body in a valve opening direction, and
wherein a solenoid actuator is constituted by the movable element, the valve body, and the biasing unit, the solenoid actuator being adapted to move the valve body in a valve closing direction by application of an axial thrust force according to an energization current onto the movable element.

2. The suspension apparatus according to claim 1, wherein the damping force adjustable shock absorber generates a damping force of a higher damping characteristic than the soft characteristic when the movable element is maximally separated from the valve seat.

3. The suspension apparatus according to claim 1, wherein the controller performs the initialization control when the vehicle starts running.

4. The suspension apparatus according to claim 1, wherein the controller performs the initialization control after a piston speed of the damping force adjustable shock absorber reaches or exceeds a predetermined speed.

5. The suspension apparatus according to claim 1, wherein the controller performs the initialization control every time a predetermined time has elapsed.

6. The suspension apparatus according to claim 1, wherein the controller performs the initialization control after the vehicle has stopped.

7. The suspension control apparatus according to claim 1, further comprising a temperature monitoring unit adapted to monitor a temperature of a control valve of the damping force adjustable shock absorber,
wherein the controller performs the initialization control according to the temperature of the control valve.

8. The suspension control apparatus according to claim 1, wherein a current value of the initialization control is set to a current value for generating the hard characteristic.

9. The suspension control apparatus according to claim 1, wherein a current value of the initialization control is set to a minimum current value capable of moving the valve body from a position when the valve body is not energized.

10. The suspension apparatus according to claim 9, wherein, when the vehicle starts to be accelerated during execution of the initialization control, the control current is set to a current value larger than the minimum current value capable of moving the valve body.

11. A suspension control apparatus comprising:
a damping force adjustable shock absorber disposed between a body and each wheel of a vehicle, the damping force adjustable shock absorber being capable of adjusting a damping force characteristic by adjustment of a control current to be supplied to a solenoid;
a running state detector adapted to detect a running state of the vehicle; and
a controller adapted to calculate a damping force that the controller causes the damping force adjustable shock absorber to generate based on a detection result of the running state detector, and determine a current value of the control current based on a result of the calculation, thereby performing normal control,
wherein the damping force adjustable shock absorber is adapted to generate a hard characteristic by a current value larger than a current value of the control current corresponding to a soft characteristic,
wherein the controller performs initialization control, according to which the controller switches the control current to a current value larger than the current value for instructing the damping force of the soft characteristic, and after that, performs the normal control, and
wherein the controller performs the initialization control after a piston speed of the damping force adjustable shock absorber reaches or exceeds a predetermined speed.

12. A suspension control apparatus comprising:
a damping force adjustable shock absorber disposed between a body and each wheel of a vehicle, the damping force adjustable shock absorber being capable of adjusting a damping force characteristic by adjustment of a control current to be supplied to a solenoid;
a running state detector adapted to detect a running state of the vehicle;
a controller adapted to calculate a damping force that the controller causes the damping force adjustable shock absorber to generate based on a detection result of the running state detector, and determine a current value of the control current based on a result of the calculation, thereby performing normal control; and
a temperature monitoring unit adapted to monitor a temperature of a control valve of the damping force adjustable shock absorber,
wherein the damping force adjustable shock absorber is adapted to generate a hard characteristic by a current value larger than a current value of the control current corresponding to a soft characteristic,
wherein the controller performs initialization control, according to which the controller switches the control current to a current value larger than the current value for instructing the damping force of the soft characteristic, and after that, performs the normal control, and
wherein the controller performs the initialization control according to the temperature of the control valve.

* * * * *